Jan. 19, 1960 K. M. WELCH 2,921,639
GAUGE WHEEL FOR TWO-WAY PLOW
Filed Aug. 19, 1957 3 Sheets-Sheet 1
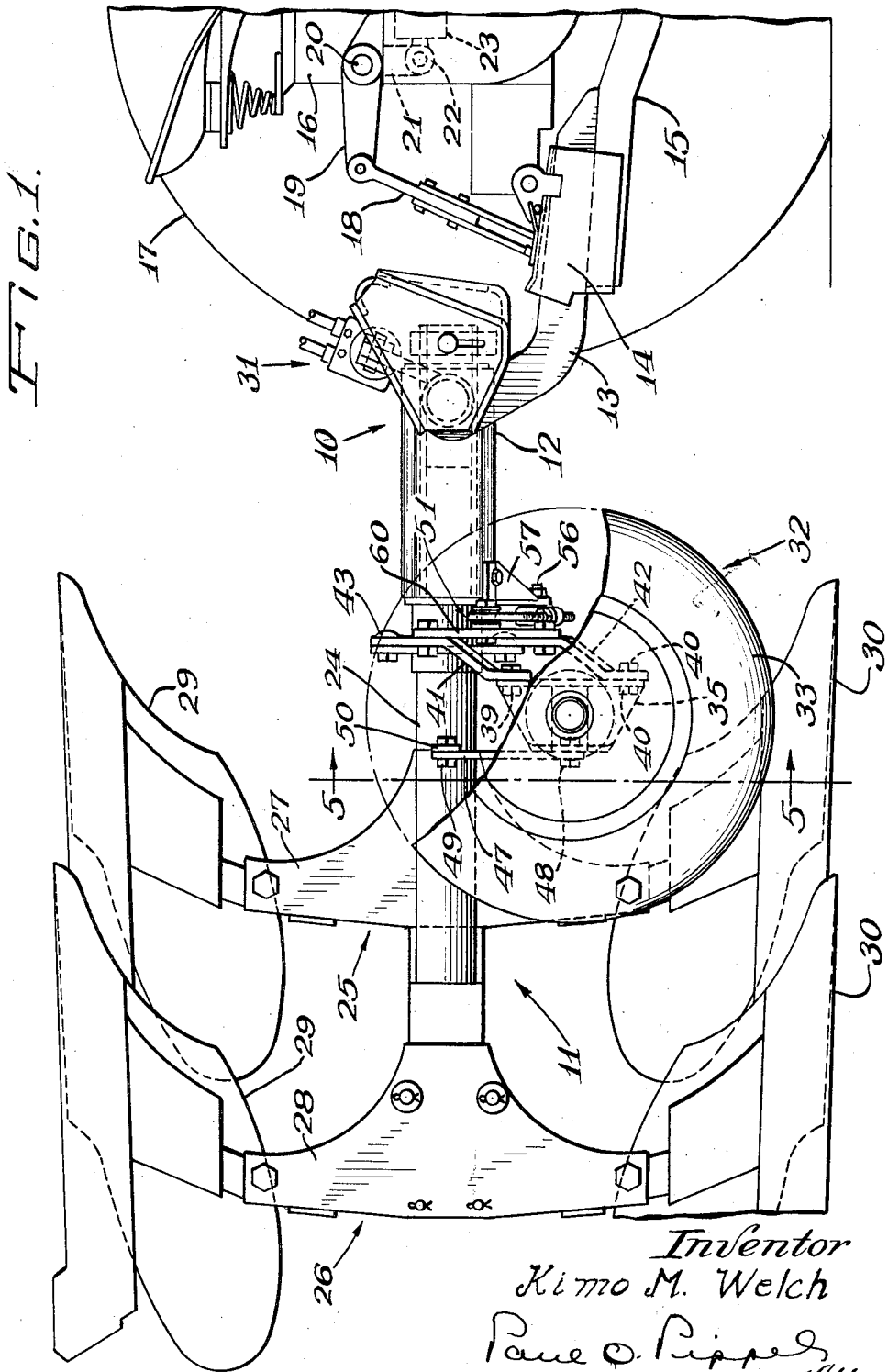
Inventor
Kimo M. Welch

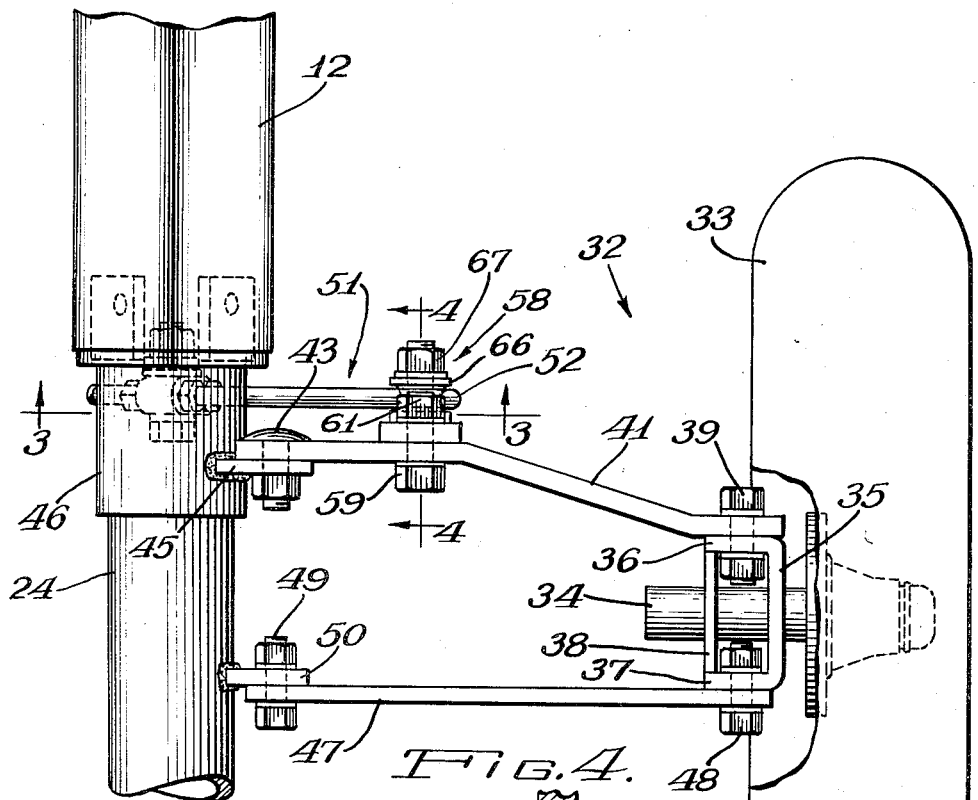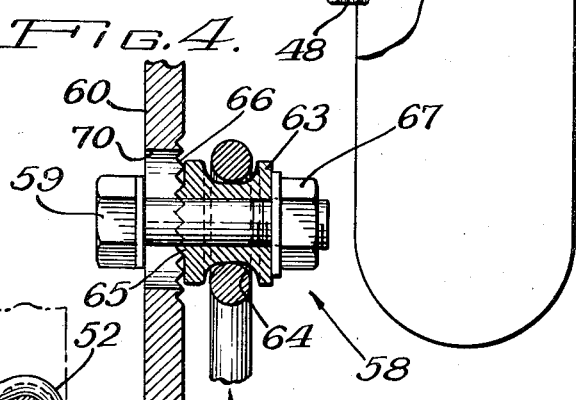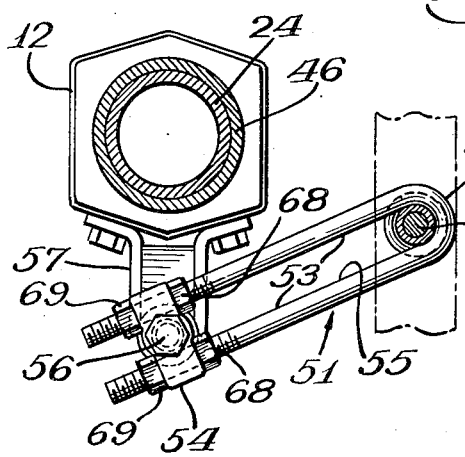

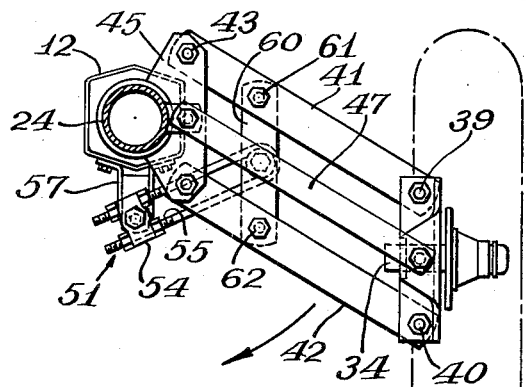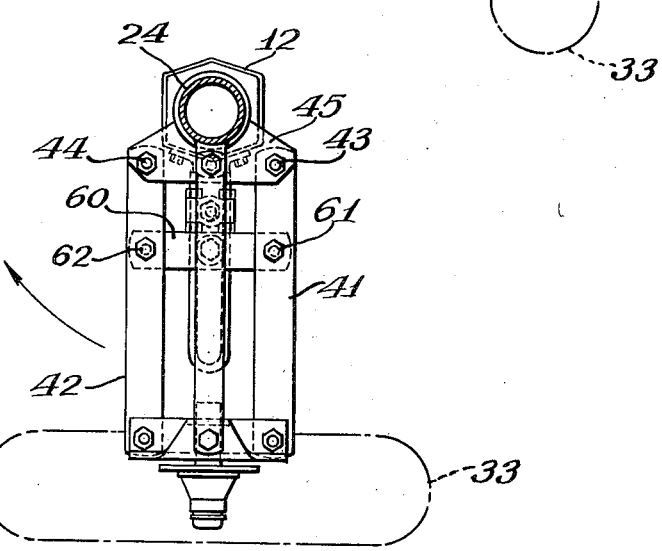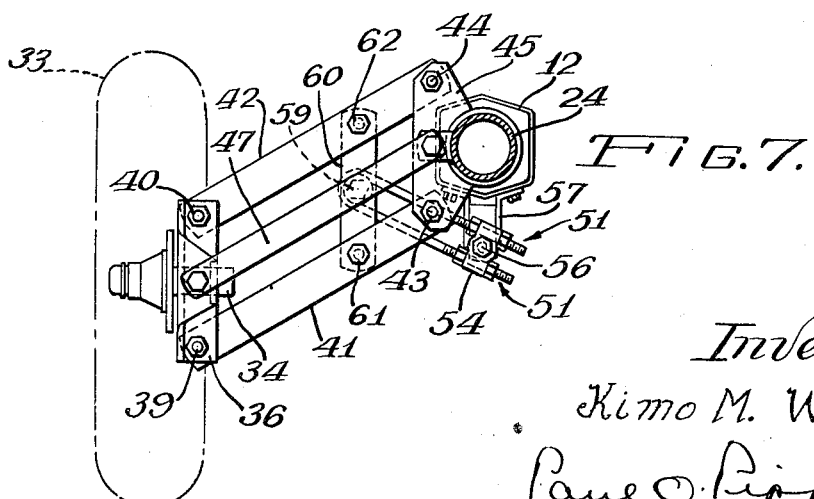

United States Patent Office 2,921,639
Patented Jan. 19, 1960

2,921,639
GAUGE WHEEL FOR TWO-WAY PLOW

Kimo M. Welch, Palo Alto, Calif., assignor to International Harvester Company, Chicago, Ill., a corporation of New Jersey Application August 19, 1957, Serial No. 679,006

5 Claims. (Cl. 172—212)

This invention relates to agricultural implements and particularly two-way plows. More specifically, the invention concerns a two-way plow of the roll-over type and a gauge wheel therefor.

An object of the invention is the provision, in a two-way plow wherein right and left-hand plowing units are mounted for alternate operation on a rotatable carrier, a single gauge wheel assembly arranged to serve each of the plow units.

Another object of the invention is the provision of a novel mounting for the gauge wheel of a two-way plow which maintains the wheel substantially level during vertical movement thereof and which is swung bodily with the plow carrier from one operating position to another with respect to the plow bottoms.

Another object of the invention is the provision, in a two-way roll-over plow, of a novel parallel link suspension gauge wheel adapted to move into operating position for each of the alternately operating plow units, and novel adjustable stop means by which the position of the gauge wheel with respect to the operating plow bottom may be regulated.

Other objects and advantages of the invention will become clear from the following detailed description when read in conjunction with the accompanying drawings wherein:

Figure 1 is a view in side elevation, with parts broken away, of the rear end of a tractor having mounted thereon a two-way plow having a gauge wheel assembly incorporating the features of this invention;

Figure 2 is an enlarged detail in plan showing the gauge wheel assembly of this invention;

Figure 3 is a section taken on the line 3—3 of Figure 2;

Figure 4 is a section taken on the line 4—4 of Figure 2;

Figure 5 is a sectional view of the implement frame taken on the line 5—5 of Figure 1 and showing the gauge wheel in position for gauging the operating depth of the left-hand plow units;

Figure 6 is a view similar to Figure 5 showing the half-way position of the gauge wheel assembly upon the rotation of the tool carrier from the position of Figure 5, gauging the left-hand plow units, to the opposite side of the plow frame; and Figure 7 is a view similar to Figures 5 and 6 showing the gauge wheel assembly after it has moved from the central position of Figure 6 to the other side of the tool carrier to gauge the operating depth of the alternately operating plow unit.

The gauge wheel assembly of this invention is shown and described herein in its application to a tractor-mounted two-way plow of the type wherein the earth-working tools are mounted on a carrier which is rotatable about a longitudinal axis relative to the direction of travel. The plow of this invention comprises a main supporting frame 10 and a plow-carrying sub-frame 11. Main frame 10 includes a tubular portion 12 and a pair of laterally spaced forwardly projecting shaft members 13, only one of which is shown, adapted to be slidably received in complementary socket members 14 mounted on a drawbar 15 adapted to be connected in draft-receiving relation to the body 16 of a tractor having laterally spaced drive wheels 17, only one of which is shown. The implement is raised and lowered with respect to the tractor by lift means including lift links 18 connected to the sockets 14 and to the ends of lift arms 19 secured to a rockshaft 20 mounted on the tractor and having another arm 21 affixed thereto and connected to the piston rod 22 of a hydraulic ram 23 receiving fluid under pressure under the control of the tractor operator, from a source, not shown, on the tractor.

The tubular portion 12 of main frame 10 has rotatably received therein the forward end of a tool-carrier or subframe in the form of a tubular member 24, which projects rearwardly from the main frame member 12 and has mounted thereon a pair of right and left-hand plow assemblies 25 and 26. The plow assemblies 25 and 26 include vertically extending brackets or standards 27 and 28, respectively, upon the opposite ends of which are mounted right and left-hand plow bottoms 29 and 30, respectively.

The plow bottoms 29 and 30 are mounted 180° apart on the standards 27 and 28 and the tool-carrying sub-frame 24 is rotated 180° to alternately place the plow bottoms in operation, by reversing mechanism, the details of which form no part of this invention and which is generally indicated at 31. Further details of the plow construction and the reversing mechanism may be had by reference to co-pending U.S. application Serial No. 615,195, filed October 10, 1956, now Patent No. 2,839,-979, granted June 24, 1958. The depth of operation of each of the sets of plow bottoms 29 and 30 is gauged by a unitary gauge wheel assembly 32 which comprises a ground-engaging wheel 33 mounted for rotation upon a stub axle 34 having affixed thereto a bracket 35, which is channel-shaped and provided with flanges 36 and 37 closed by a plate 38 which also supports the axle 34.

Bracket 35 extends vertically in the operating position of the gauge wheel assembly and flange 36 has pivotally mounted thereon by means of vertically spaced bolts 39 and 40, the outer ends of a pair of vertically spaced parallel links 41 and 42, the inner ends of which are pivotally mounted upon pivot bolts 43 and 44 carried by a vertically extending bracket 45 affixed to a sleeve 46 secured to the tool carrier 24 and rotatable therewith. Bracing is provided by a third link 47, generally parallel to links 41 and 42 but spaced longitudinally therefrom, having its outer end pivotally mounted upon a bolt 48 carried by flange 37, and its inner end pivotally connected by a bolt 49 to a lug 50 affixed to the tubular carrier 24.

Gauge wheel 33 rides upon the unplowed ground and regulates the operating depth of the operating plow bottoms. Limitation of the upward movement of the gauge wheel 33 to maintain a selected operating depth for the earth-working tools is effected by stop mechanism comprising an elongated U-bolt 51 having a bight portion 52 and arms 53 threaded for reception in a sliding block 54 forming with the bight portion 52 an elongated slotted space 55. Block 54 is pivotally mounted upon a bolt 56 carried by a bracket 57 secured to the under surface of the stationary main frame member 12, accommodating swinging of the U-bolt about a longitudinal axis below the axis of rotation of the tool carrier 24.

The elongated space or slot 55 in the U-bolt 51 serves for the slidable reception of a stop member 58 comprising a bolt 59 centrally carried by a strap 60 which is pivotally connected to the respective parallel links 41 and 42 by bolts 61 and 62.

In addition to bolt 59, stop member 58 includes a block 63 mounted on the shank of bolt 59 having a circumferential groove 64 therein receiving the arms 53 of the U-bolt 51, one face of the block having serrations 65 engageable with complementary serrations 66 in the adjacent face of strap 60. Block 63 is held tightly against the strap 60 by the provision of a nut 67 on the threaded end of bolt 59.

Member 58 engaging the end of U-bolt 51 serves as a stop to limit the upward movement of the gauge wheel 33.

In Figure 1 the left-hand plow bottoms 30 are shown in operation while the gauge wheel 33 is riding on unplowed ground at the right-hand side of the tool-carrier 24. Upon reaching the end of the field and turning the tractor to traverse the field in the opposite direction, the operator actuates his ram 23 to swing the lift arms 19 and drawbar 15 and raise the implement out of the ground.

The reversing mechanism 31 is then actuated to rotate the carrier 180° about its axis to place the alternate set of plow bottoms in operation. By virtue of the fact that it is mounted upon the tool-carrier 24, gauge wheel assembly 32 rotates therewith bodily as indicated diagrammatically in Figures 5, 6 and 7. Figure 5 shows the position of the gauge wheel 33 corresponding to the position of Figure 1. Figure 6 shows a half-way position of the entire gauge wheel assembly as the tool carrier is rotated, and Figure 7 shows the gauge wheel unit on the opposite side of the axis of the tool carrier in position for gauging the right-hand plow bottoms. During the reversing operation stop member 58 slides in the slot 55 formed by U-bolt 51 until the gauge wheel engages the ground on the opposite side of the tool carrier when the implement is again lowered. The stop member 58 then slides into the bight 52 of the U-bolt, engaging the end thereof to limit the upward movement of the gauge wheel and thus establish the operating depth of the plow bottoms.

Adjustment in the operating depth of the plow bottoms is made by adjusting the vertical position of the gauge wheel assembly relative to the tool carrier, and this is accomplished by loosening nuts 68 on arms 53 of the U-bolt 51 at one side of the sliding block 54 while tightening the nuts 69 on the opposite side of the block for shallower plowing, the reverse procedure being followed for deeper plowing.

The swivel or pivot member 56 is mounted in the same vertical plane as the axis of the tool carrier 24, and as clearly shown in Figures 5, 6 and 7, U-bolt 51 swings with the tool carrier during the reversing operation from one side of the axis of the carrier to the other, so that regardless of which of the alternately operating sets of plow bottoms is in operation, the depth of operation selected remains the same upon reversing the plows. However, to allow for uneven wear and manufacturing tolerances in the opposing plow units, an additional adjustment is made possible by the provision of a slot 70 in strap 60 in which bolt 59 is seated, and minor adjustments are made by loosening nuts 67 on bolt 59 and adjusting block 63 up or down with respect to strap 66. By virtue of the parallel link mounting of the gauge wheel 33 on the tool carrier 24, the movement of the gauge wheel relative to the carrier is in a substantially vertical plane and the operating characteristics thereof over those of conventional gauge wheels are greatly improved.

The operation of the novel gauge wheel mounting of this invention should be clearly understood from the foregoing description. It should likewise be understood that modifications may be made in the invention without departing from the spirit thereof or the scope of the appended claims.

What is claimed is:

1. In a two-way plow, a support, a frame rotatable about a longitudinal axis including a tool-carrying member having right and left-hand plowing units mounted on opposite sides thereof and alternately operable upon rotation of said frame, a pair of vertically spaced parallel links pivotally mounted on said frame and extending laterally therefrom, and a gauge wheel operatively connected to the outer ends of said links for swinging therewith in a vertical plane, said links and said wheel being rotatable with the tool-carrying frame in a transverse vertical plane from one side to the other of the axis of the frame to alternately serve as a gauging means for said alternately operating plowing units, and single stop means carried by the support operatively connected to said links and effective upon rotation of said frame and swinging of said links to either side of the axis of said frame to limit the vertical movement of said links and said gauge wheel relative to the operating plow unit comprising another link pivotally mounted at one end on the support centrally thereof for lateral swinging with said parallel links from one side to the other of the axis of said frame, and means pivotally and slidably connecting the other end of said other link to said parallel links to limit vertical swinging of the latter in one direction.

2. In a two-way plow, a support, a frame rotatable about a longitudinal axis including a tool-carrying member having right and left-hand plowing units mounted on opposite sides thereof and alternately operable upon rotation of said frame, a pair of vertically spaced parallel links pivotally mounted on said frame and extending laterally therefrom, and a gauge wheel operatively connected to the outer ends of said links for swinging therewith in a vertical plane, said links and said wheel being rotatable with the tool-carrying frame in a transverse vertical plane from one side to the other of the axis of the frame to alternately serve as a gauging means for said alternately operating plowing units, and single stop means carried by the support operatively connected to said links and effective upon rotation of said frame and swinging of said links to either side of the axis of said frame to limit the vertical movement of said links and said gauge wheel relative to the operating plow unit, said stop means comprising a slotted member pivotally mounted on said support for lateral swinging relative thereto, and a stop member mounted on said parallel links, said stop member being slidably retained in the slot in said slotted member and engageable with one end thereof to limit the swinging of said parallel links.

3. In a two-way plow including a support and a tool-carrying frame having alternately operating right and left-hand plowing units thereon mounted on said support for rotation about a longitudinal axis to alternately place one plowing unit in operation while the other is disposed on the opposite side of the axis of said tool-carrying frame in an inoperative position, gauging means mounted on the tool-carrying frame and rotatable therewith about said longitudinal axis to dispose said gauging means on laterally opposite sides of said axis to serve as a common gauging means for both of said plowing units, comprising a wheel rotatable in a generally vertical plane at one side of said frame, and a pair of generally parallel links extending laterally from said frame and pivotally connected at one end thereto and at the other end to said wheel, said links being swingable in a transverse vertical plane upon rotation of said frame, another link pivotally connected to the support for lateral swinging, and means operatively connecting said other link to said parallel links for swinging therewith to opposite sides of the axis of said frame to limit the upward movement of the parallel links relative thereto.

4. The invention set forth in claim 3, wherein said other link is in the form of an elongated U-bolt having a part on the parallel links slidably received between the arms of said U-bolt and engageable with the bight portion thereof to limit the movement of the parallel links and of the gauge wheel relative to said frame.

5. The invention set forth in claim 4, wherein means are provided to adjust the effective length of said U-bolt to vary the spacing between said part and the pivotal connection of said U-bolt to the support, whereby the extent of vertical swinging of said parallel links is varied.

References Cited in the file of this patent

FOREIGN PATENTS 665,664    Great Britain _____ Jan. 30, 1952

OTHER REFERENCES

Gebruder Eberhardt: German application Serial No. E9322, printed May 24, 1956 (Klasse 45a 25).